(12) United States Patent
Wilkinson

(10) Patent No.: US 10,620,872 B2
(45) Date of Patent: Apr. 14, 2020

(54) REPLICATING DATA IN A DATA STORAGE SYSTEM

(71) Applicant: International Business Machines Corporation, Armonk, NY (US)

(72) Inventor: John P. Wilkinson, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/234,654

(22) Filed: Dec. 28, 2018

(65) Prior Publication Data

US 2019/0138214 A1 May 9, 2019

Related U.S. Application Data

(63) Continuation of application No. 15/437,166, filed on Feb. 20, 2017, now Pat. No. 10,168,948.

(51) Int. Cl.
*G06F 3/06* (2006.01)
*G06F 11/14* (2006.01)

(52) U.S. Cl.
CPC ............... *G06F 3/065* (2013.01); *G06F 3/061* (2013.01); *G06F 3/0611* (2013.01);
(Continued)

(58) Field of Classification Search
CPC ............ G06F 11/00–3696; G06F 3/00; G06F 3/06–0611; G06F 3/0613–0619; G06F 3/062–065; G06F 3/0652–0673; G06F 3/0674–0689; G06F 12/00–16; G06F 13/00–4295; G06F 17/30–30997;
(Continued)

(56) References Cited

U.S. PATENT DOCUMENTS 5,542,065 A * 7/1996 Burkes .................. G06F 3/0601
711/114
6,411,991 B1 * 6/2002 Helmer ............... H04L 67/1095
707/999.202

(Continued)

OTHER PUBLICATIONS

List of IBM Patents of Patent Applications Treated as Related (Appendix P), Dec. 28, 2018, 2 pages.
(Continued)

*Primary Examiner* — Daniel C. Chappell
(74) *Attorney, Agent, or Firm* — Francis Lamme; Stephen J. Walder, Jr.; Robert M. Sullivan

(57) ABSTRACT

A mechanism is provided for replicating data in a data storage system that comprises a first data storage device, a second data storage device, and a third data storage device arranged to receive write requests from the first data storage device and second data storage device. The first data storage device or the second data storage device is selected using a characteristic of the first data storage device and the second data storage device. The first data storage device receives a first write request and sends the first write request to the second data storage device, and the second data storage device receives a second write request and sends the second write request to the first data storage device. The data storage device selected using the characteristic sends a write request to the third storage device in response to a notification the non-selected data storage device has completed the update.

12 Claims, 11 Drawing Sheets

(52) U.S. Cl.
CPC .......... *G06F 3/0619* (2013.01); *G06F 3/0673* (2013.01); *G06F 3/0683* (2013.01); *G06F 3/0685* (2013.01); *G06F 11/1402* (2013.01)

(58) Field of Classification Search
CPC ........ G06F 21/00–88; G06F 2003/0691–0698; G06F 2201/00–885; G06F 2206/00–20; G06F 2211/00–902; G06F 2212/00–7211; G06F 2213/00–4004; G06F 2216/00–17; G06F 2221/00–2153; H04L 29/00; H04L 29/02; H04L 29/06; H04L 29/08; H04L 29/08081; H04L 29/08135; H04L 29/0854
See application file for complete search history.

(56) References Cited

U.S. PATENT DOCUMENTS

| | | | |
|---|---|---|---|
| 7,103,586 B2 | 9/2006 | Holenstein et al. | |
| 7,809,892 B1* | 10/2010 | Chatterjee | G06F 11/2028 711/143 |
| 8,682,852 B1* | 3/2014 | Salamon | G06F 11/1471 707/640 |
| 8,868,857 B2 | 10/2014 | Wilkinson | |
| 8,868,874 B2 | 10/2014 | Wilkinson | |
| 8,892,938 B1* | 11/2014 | Sundaram | G06F 11/2092 714/6.21 |
| 8,938,419 B2 | 1/2015 | Sustman et al. | |
| 9,116,862 B1* | 8/2015 | Rath | G06F 11/2097 |
| 9,389,958 B2* | 7/2016 | Sundaram | G06F 11/1008 |
| 9,569,320 B2* | 2/2017 | Werner | G06F 11/2056 |
| 9,619,256 B1* | 4/2017 | Natanzon | G06F 9/45558 |
| 2004/0260967 A1* | 12/2004 | Guha | G06F 11/008 714/3 |
| 2005/0080991 A1* | 4/2005 | Keohane | G06F 11/2056 711/114 |
| 2007/0185938 A1* | 8/2007 | Prahlad | G06F 16/2365 |
| 2008/0320299 A1* | 12/2008 | Wobber | H04L 9/12 713/156 |
| 2009/0177710 A1 | 7/2009 | Holenstein et al. | |
| 2013/0191336 A1* | 7/2013 | Ducott | G06F 21/6218 707/634 |
| 2013/0279504 A1* | 10/2013 | Gulati | H04L 45/16 370/390 |
| 2014/0351214 A1 | 11/2014 | Abercrombie et al. | |
| 2015/0142739 A1* | 5/2015 | Mutalik | G06F 3/0604 707/613 |

OTHER PUBLICATIONS

"EMC VNX Replication Technologies: An Overview", EMC Corporation, https://www.emc.com/collateral/white-papers/h12079-vnx-replication-technologies-overview-wb.pdf, Nov. 2015, 34 pages.

"MSA Remote Snap Software", Hewlett Packard Enterprise, http://h20195.www2.hp.com/v2/GetPDF.aspx/4AA1-0977ENW.pdf, Technical white paper, Feb. 2014, 76 pages.

Kaveevivitchai, Sathita et al., "Independent DTNs Message Deletion Mechanism for Multi-copy Routing Scheme", Proceedings of the Sixth Asian Internet Engineering Conference, Nov. 15-17, 2010, 8 pages.

Morgan, Andrew, "MySQL Cluster Asynchronous Replication—conflict detection & resolution", ClusterDB, http://www.clusterdb.com/mysql-cluster/mysql-cluster-asynchronous-replication-conflict-detection-resolution1, Andrew Morgan on Databases, Sep. 11, 2013, 6 pages.

Spaho, Evjola et al., "Data Replication Strategies in P2P Systems: A Survey", 17th International Conference on Network-Based Information Systems, Sep. 10-12, 2014, 8 pages.

Sun, Xin et al., "An Efficient Replica Location Method in Hierarchical P2P Networks", 2009 Eighth IEEE/ACIS International Conference on Computer and Information Science, Jun. 1-3, 2009, 6 pages.

Zhao, Jing et al., "Achieving Reliability through Replication in a Wide-Area Network DHT Storage System", 2007 International Conference on Parallel Processing, Sep. 10-14, 2007, 8 pages.

\* cited by examiner

REPLICATING DATA IN A DATA STORAGE SYSTEM

BACKGROUND

The present application relates generally to an improved data processing apparatus and method and more specifically to mechanisms for replicating data in a data storage system.

In data storage systems, it is often desirable to have stored data replicated in multiple locations, so that the data is available locally in each of the locations. Each location will have a local data storage device, which can satisfy requests to read data on its own, i.e. without needing to query other data storage devices of the data storage system. However, requests to write data need to be distributed to each location, so that they can be applied in a consistent fashion. In particular, if multiple write requests are made to a particular region of storage, such as a block, sector or page of data in the storage, the writes must be applied in the same order by each local data storage device, otherwise the data stored in each local data storage device will not be the same. When write requests are received that could potentially not be applied in the same order on different local data storage devices, this is known as a "write collision".

With such systems, it can also be desirable to have data replicated in a location by a data storage that does not itself receive any requests to write data (other than those required to keep the data synchronised with the other locations). Such a data storage device may be used during migration from one location to another, for example, or to provide a backup in case one of the data storage devices that receives write requests fails.

A naïve solution to this problem would be to forward all write requests to a single data storage device, and coordinate all updates through that site. However, a drawback of this is that the write latency will be significantly higher for write requests received by data storage devices other than the one performing coordination, most likely twice as high.

U.S. Pat. No. 8,868,857 B2, published 21 Oct. 2014, discloses a method of managing remote data replication in which an index generator generates an ordered index of writes made to replicated data storage.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a computer-implemented method is provided for replicating data in a data storage system. The data storage system comprises: a first host device in communication with the first data storage device; a second data storage device comprising a set of data regions corresponding to the set of data regions of the first data storage device; a second host device in communication with the second data storage device; and a third data storage device comprising a set of data regions corresponding to the set of data regions of the first data storage device and the set of data regions of the second data storage device, the third storage device being arranged to receive write requests from only the first data storage device and second data storage device. The illustrative embodiment selects one of the first data storage device and the second data storage device using a characteristic of the first data storage device and the second data storage device. The illustrative embodiment receives, in the first data storage device, a first write request from the first host device to update a first subset of the data regions and sends, from the first data storage device, the first write request to the second data storage device. The illustrative embodiment receives, in the second data storage device, a second write request from the second host device to update a second subset of the data regions, and send, from the second data storage device, the second write request to the first data storage device. In the case that the first data storage device is selected using the characteristic and in response to a notification from the second data storage device that the second data storage device has been updated in accordance with the first write request, the illustrative embodiment sends, from the first data storage device, a write request based on the first write request and the second write request to the third storage device. In the case that the second data storage device is selected using the characteristic and in response to a notification from the first data storage device that the first data storage device has been updated in accordance with the second write request, the illustrative embodiment sends, from the second data storage device, a write request based on the first write request and the second write request to the third storage device.

By using a characteristic of the first data storage device and the second data storage device to select one of the data storage devices, the selected data storage device can be designated as the "leader", and the other device as the "follower". This allows the first and second data storage device to apply write requests in a way that keeps the data stored by both data storage devices consistent, by using the designation of the data storage devices as leader and follower to determine which data storage device should "win" in the case there is a write collision. However, advantageously in addition with the invention, the designation of the data storage devices as leader and follower is used to determine which data storage devices sends the write request to the third data storage device in order to keep the third storage device consistent with the first and second data storage devices.

As the selection of follower and leader is based upon a characteristic of the first data storage device and the second data storage device, the second data storage device can also perform the same method, taking the role of follower if the first data storage device is the leader and vice versa. In this way, the first data storage device and second data storage device can between them ensure that the third data storage device replicates the data stored by the first and second data storage devices, without both having to send write requests to the third data storage device and with then number of messages that need to be sent between the first data storage device and second data storage device to allow this to occur being reduced, and the time taken to complete a write request being reduced.

Preferably, the data storage device selected using the characteristic, in response to a notification from the third data storage device that the third data storage device has been updated in accordance with the write request, sends a notification to the data storage device not selected using the characteristic that the third data storage device has been updated.

Advantageously, the data storage device not selected using the characteristic stores details indicative of received write requests. In this case, advantageously the data storage device not selected using the characteristic, in response to a notification from the data storage device selected using the characteristic that the third data storage device has been updated in accordance with a write request, deletes details indicative of the write request. Again in that case, advantageously in the case that the data storage device selected using the characteristic fails, the data storage device not selected using the characteristic sends the write requests indicated by the stored details to the third data storage device. In this way, the third data storage device can be provided with all the required write requests by the non-selected data storage device despite the fact that the selected data storage device has failed. The third data storage device may then be used to replace the first data storage device, if desired.

The first data storage device may receive the second write request from the second data storage device prior to the notification from the second data storage device that the second data storage device has been updated in accordance with the first write request. In the case that the first data storage device is selected using the characteristic, the first data storage device updating only its data regions that are in the second subset but not in the first subset in accordance with the second write request. In the case that the second data storage device is selected using the characteristic, the first data storage device updating its data regions that are in the second subset in accordance with the second write request. In this case, the first data storage device may send a notification to the second data storage device that the first storage device has been updated in accordance with the second write request, wherein the notification comprises an indication of its updated data regions that were in the first subset and in the second subset. Again in this case, the first data storage device may, in response to receiving a notification from the second data storage device that the second data storage device has been updated in accordance with the first write request, sending a notification to the host device that the first write request has been completed.

The characteristic of the first data storage device and the second data storage device may be the MAC addresses of the first data storage device and the second data storage device. Any other suitable characteristic of the first data storage device and the second data storage device could be used, as long the characteristic provides a consistent selection.

Preferably, the selecting of one of the first data storage device and the second data storage device using a characteristic of the first data storage device and the second data storage device is done by the first data storage device. Alternatively, the selection may be done by another device, for example a management device of the data storage system. The selection may be done during the processing of the write requests, or at an earlier time.

In other illustrative embodiments, a data storage system is provided for replicating data, the data storage system comprises a first data storage device comprising a set of data regions; a first host device in communication with the first data storage device; a second data storage device comprising a set of data regions corresponding to the set of data regions of the first data storage device; a second host device in communication with the second data storage device; and a third data storage device comprising a set of data regions corresponding to the set of data regions of the first data storage device and the set of data regions of the second data storage device, the third storage device being arranged to receive write requests from only the first data storage device and second data storage device. The illustrative embodiment selects one of the first data storage device and the second data storage device using a characteristic of the first data storage device and the second data storage device. The illustrative embodiment receives, in the first data storage device, a first write request from a first host device to update a first subset of the data regions. The illustrative embodiment sends, from the first data storage device, the first write request to the second data storage device. The illustrative embodiment receives, in the second data storage device, a second write request to update a second subset of the data regions from the second host device. The illustrative embodiment sends, from the second data storage device, the second write request to the first data storage device. In the case that the first data storage device is selected using the characteristic and in response to a notification from the second data storage device that the second data storage device has been updated in accordance with the first write request, the illustrative embodiment sends, from the first data storage device, a write request based on the first write request and the second write request to the third storage device. In the case that the second data storage device is selected using the characteristic and in response to a notification from the first data storage device that the first data storage device has been updated in accordance with the second write request, the illustrative embodiment sends, from the second data storage device, a write request based on the first write request and the second write request to the third storage device.

Preferably, the data storage system is further arranged to, in the case that the first data storage device is selected using the characteristic and in response to a notification from the third data storage device that the third data storage device has been updated in accordance with the write request, send a notification to the second data storage device that the third data storage device has been updated.

Advantageously, the data storage system is further arranged to, in the case that the first data storage device is not selected using the characteristic, store details indicative of received write requests. In this case, advantageously, the data storage system is further arranged to, in the case that the first data storage device is not selected using the characteristic, in response to a notification from the second data storage device that the third data storage device has been updated in accordance with a write request, delete details indicative of the write request. Again in this case, advantageously the data storage system is further arranged to, in the case that the first data storage device is not selected using the characteristic, in the case that the second data storage device fails, send the write requests indicated by the stored details to the third data storage device.

The data storage system may be further arranged to, in the case that the first storage device receives the second write request from the second data storage device prior to the notification from the second data storage device that the second data storage device has been updated in accordance with the first write request: in the case that the first data storage device is selected using the characteristic, update only its data regions that are in the second subset but not in the first subset in accordance with the second write request, or, in the case that the second data storage device is selected using the characteristic, update its data regions that are in the second subset in accordance with the second write request. In this case, the data storage system may be further arranged to send a notification to the second data storage device that the first data storage device has been updated in accordance with the second write request, where the notification comprises an indication of its updated data regions that were in the first subset and in the second subset. Again in this case, the data storage system may be further arranged to, in response to receiving a notification from the second data storage device that the second data storage device has been updated in accordance with the first write request, send a notification to the host device that the first write request has been completed.

The characteristic of the first data storage device and the second data storage device may be the MAC addresses of the first data storage device and the second data storage device.

In yet another illustrative embodiment, a computer program product for replicating data in a computing system comprising a computer useable or readable medium having a computer readable program is provided. The computer readable program, when executed on the computing system, causes the computing device to perform various ones of, and combinations of, the operations outlined above with regard to the method illustrative embodiment. The computing system comprises a first data storage device comprising a set of data regions; a first host device in communication with the first data storage device; a second data storage device comprising a set of data regions corresponding to the set of data regions of the first data storage device; a second host device in communication with the second data storage device; and a third data storage device comprising a set of data regions corresponding to the set of data regions of the first data storage device and the set of data regions of the second data storage device, the third storage device being arranged to receive write requests from only the first data storage device and second data storage device. The illustrative embodiment selects one of the first data storage device and the second data storage device using a characteristic of the first data storage device and the second data storage device. The illustrative embodiment receives, in the first data storage device, a first write request from a first host device to update a first subset of the data regions. The illustrative embodiment sends, from the first data storage device, the first write request to the second data storage device. The illustrative embodiment receives, in the second data storage device, a second write request to update a second subset of the data regions from the second host device. The illustrative embodiment sends, from the second data storage device, the second write request to the first data storage device. In the case that the first data storage device is selected using the characteristic and in response to a notification from the second data storage device that the second data storage device has been updated in accordance with the first write request, the illustrative embodiment sends, from the first data storage device, a write request based on the first write request and the second write request to the third storage device. In the case that the second data storage device is selected using the characteristic and in response to a notification from the first data storage device that the first data storage device has been updated in accordance with the second write request, the illustrative embodiment sends, from the second data storage device, a write request based on the first write request and the second write request to the third storage device.

Preferably, the computer readable program further causes the computing system to, in the case that the first data storage device is selected using the characteristic and in response to a notification from the third data storage device that the third data storage device has been updated in accordance with the write request, send a notification to the second data storage device that the third data storage device has been updated.

It will of course be appreciated that feature values described in relation to one aspect of the present invention may be incorporated into other aspects of the present invention. For example, the method of the invention may incorporate any of the feature values described with reference to the computer system of the invention and vice versa.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
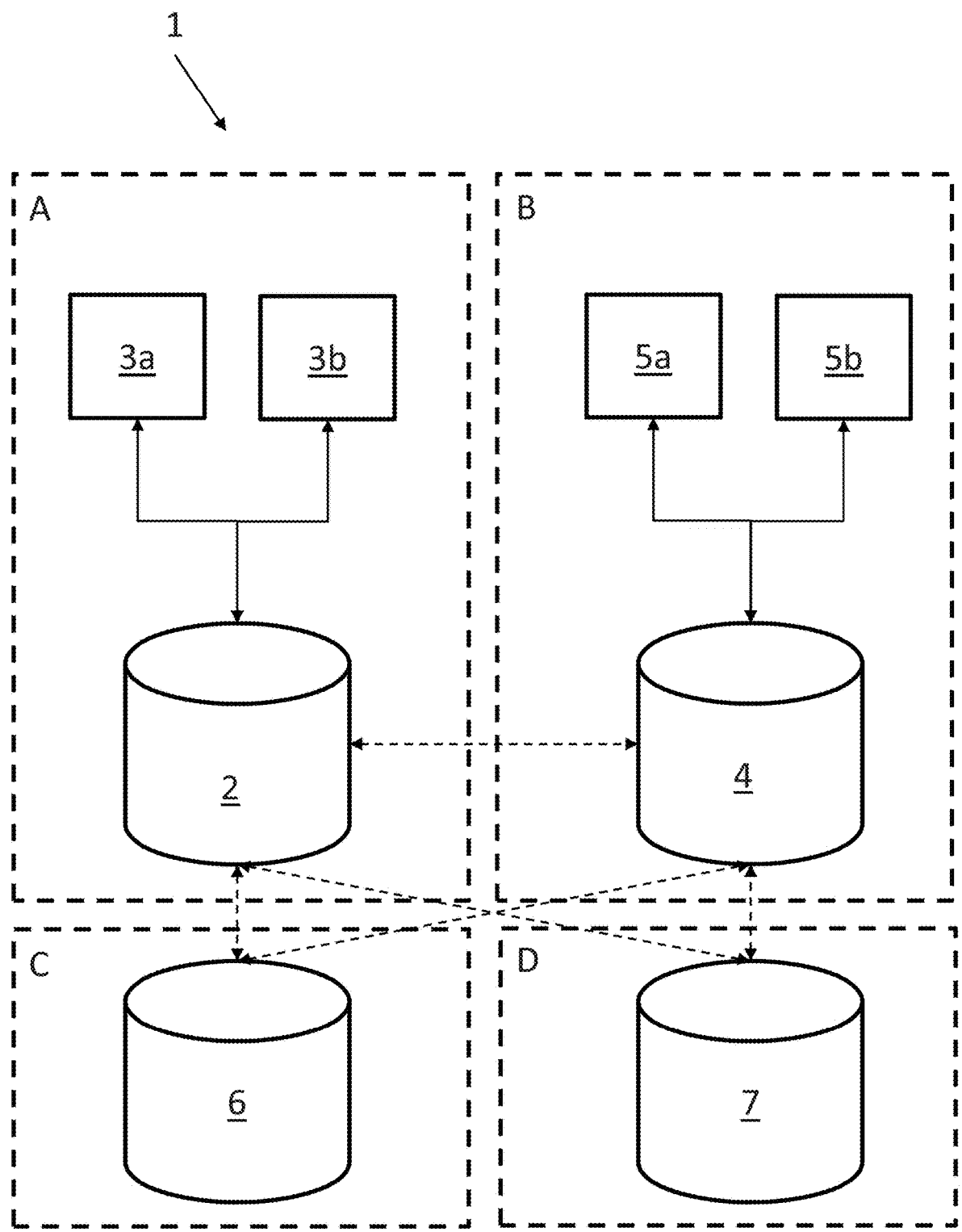
FIG. 1 is a schematic diagram of a data storage system in accordance with one illustrative embodiment.

A data storage system in accordance with one illustrative embodiment is shown in FIG. 1. The data storage system 1 comprises, at a site A, a first data storage device 2 and host devices 3*a* and 3*b*, amongst others, in communication with the first data storage device 2. The host devices 3*a* and 3*b* make requests to read data from, and write data to, the first data storage device 2. The data storage system 1 further comprises, at a site B, a second data storage device 4 and host devices 5*a* and 5*b*, amongst others, in communication with the second data storage device 4. Similarly, the host devices 5*a* and 5*b* make requests to read data from, and write data to, the second data storage device 4.

The first data storage device 2 and second data storage device 4 are in communication with each other, so that the data they store, including any updates to the data made by requests to write data, is replicated at each of site A and B.

The data storage system 1 further comprises, at a site C, a third data storage device 6, and, at a site D, a fourth data storage device 7. Unlike the first data storage device 2 at site A and the second data storage device 4 at site B, the third data storage device 6 and fourth data storage device 7 are not in communication with any host devices. As a result, the third data storage device 6 and fourth data storage device 7 will not receive any requests to read or write data. Such sites with data storage devices that are not themselves receiving write requests from host devices, and so are merely acting as copies of data stored elsewhere, are described herein as non-active sites.

However, the third data storage device 6 and fourth data storage device 7 are each in communication with the first data storage device 2 and the second data storage device 4, and each replicate the data stored at each of site A and B. In use, the third data storage device 6 and fourth data storage device 7 might for example be maintained while a migration is being done from one site to another (e.g. from site A to site C), while site A is remaining in active use; or to provide a backup for use in the case one of the first storage device 2 or second storage device 4 fails.

While in the present embodiment the third data storage device 6 and fourth data storage device 7 are located at different sites from the first data storage device 2 and the second data storage device 4, in alternative embodiments one or both may be located at the same site as first data storage device 2 or the second data storage device 4. Further, while in the present embodiments site A and state B each comprise only a single data storage device in communication with host devices, in other alternative embodiments sites may comprise multiple data storage device in communication with one or more host devices.

The first data storage device 2 and second data storage device 4 are able to replicate data between themselves, including handling write collisions where they occur, as now described with reference to FIGS. 2 to 6.

In the present embodiment, a determination is made that the first data storage device 2 is the leader and second data storage device 4 is the follower, the significance of which is explained below. This may be determined by comparing a unique ID of each, such as their MAC address, and determining that the first data storage device 4 has the higher unique ID, for example. In alternative embodiments, other methods of determining which of the first data storage device 2 and the second data storage device 4 is the leader can be used.

Figure 2:
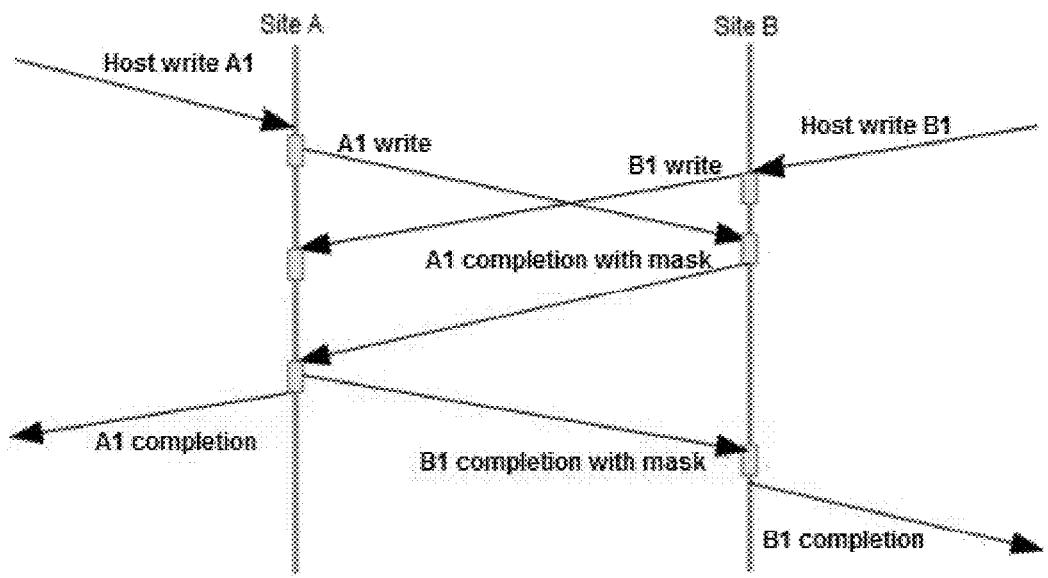
FIG. 2 is a schematic diagram showing a first example of the data storage system of FIG. 1 when handling colliding write requests in accordance with one illustrative embodiment.

A first example of the handling of colliding write requests to the first data storage device 2 and second data storage device 4 is now described with reference to FIG. 2 in accordance with one illustrative embodiment. In this example, both the first data storage device 2 and the second data storage device 4 detect a collision. This is the most common way in which collisions will occur.

A write request A1 is received by the first data storage device 2 at site A, in this example from the host device 3a. The write request A1 is applied to the first data storage device 2, and then passed to the second data storage device 4 at site B. In addition, a write request B1 is received by the second data storage device 4 at site B, in this example from the host device 5a, applied to the second data storage device 4, and passed to the first data storage device 2. The write requests can be received in either order, but the write request A1 is received, applied and passed on at the first data storage device 2 before the first data storage device 2 receives the write request B1 from the second data storage device 4; and similarly the write request B1 is received, applied and passed on at the second data storage device 4 before the second data storage device 4 receives the write request A1 from the first data storage device 2.

When the second data storage device 4 receives the write request A1 from the first data storage device 2, the second data storage device 4 detects that a collision has occurred. However, as the first data storage device 2 has been determined to be the leader, the second data storage device 4 applies the write request A1 completely (i.e. including any regions written to by the write request B1). The second data storage device 4 then sends a completion notification A1 (i.e. a notification that the write request A1 has been applied) to the first data storage device 2, along with a collision mask indicating the regions of write request B1 overwritten by write request A1.

Either before or after the second data storage device 4 receives the write request A1 from the first data storage device 2, the first data storage device 2 receives the write request B1 from the second data storage device 4, and detects that a collision has occurred. In this case, as the first data storage device 2 has been determined to be the leader, the first data storage device 2 applies only the non-colliding regions of the write request B1 (i.e. not including any regions written to by the write request A1). The first data storage device 2 then sends a completion notification B1 to the second data storage device 4, along with a collision mask indicating the regions of write request B1 that were not written.

When the first data storage device 2 receives the completion notification A1 from the second data storage device 4, the first data storage device 2 sends a completion notification A1 to the host device 3a. Similarly, when the second data storage device 4 receives the completion notification B1 from the first data storage device 2, the second data storage device 4 sends a completion notification B1 to the host device 5a. Both the first data storage device 2 and the second data storage device 4 then know that no further processing of the write requests is required. In this way, the first data storage device 2 and second data storage device 4 both apply the write request A1 prior to the write request B1, and so the changes made to their data are consistent.

Figure 3:
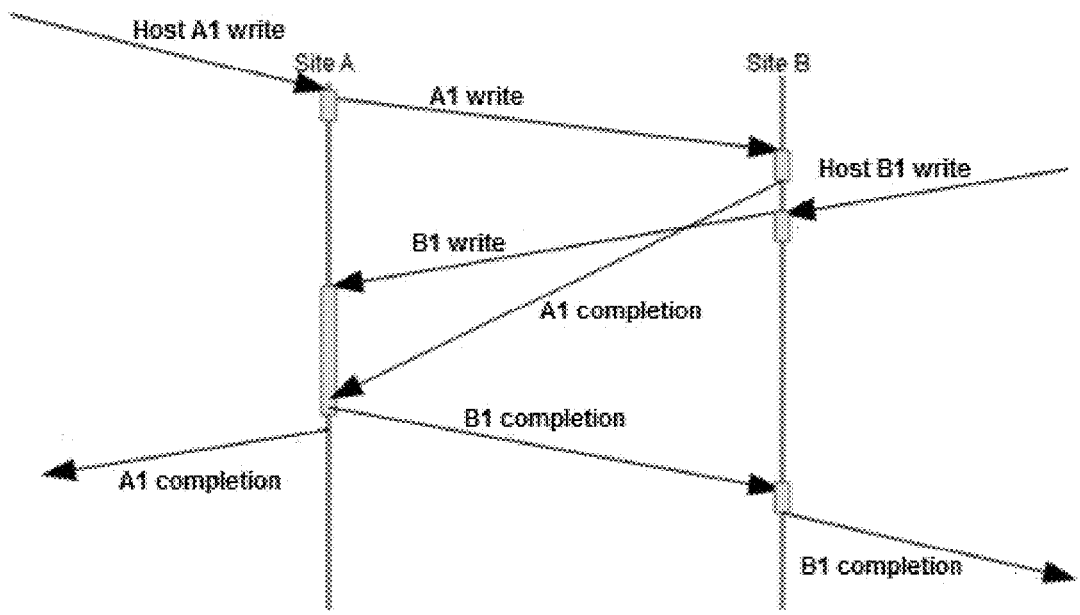
FIG. 3 is a schematic diagram showing a second example of the data storage system of FIG. 1 when handling colliding write requests in accordance with one illustrative embodiment.

A second example of the handling of colliding write requests to the first data storage device 2 and second data storage device 4 is now described with reference to FIG. 3 in accordance with one illustrative embodiment. This example can only occur in a data storage system in which messages can be received out-of-order; in other words, if two messages sent from a first device to another device can be received in the opposite order to which they are sent. In the case of a data storage system in which message cannot be received out-of-order, only collisions of the type shown in FIG. 1 can occur. In this example, only the first data storage device 2 detects a collision, and the second data storage device 4 has been passed and applied a write request from the second data storage device 4 prior to the first data storage device 2 receiving a local write request.

First, a write request A1 is received by the first data storage device 2 from the host device 3a, applied to the first data storage device 2, and passed to the second data storage device 4. The write request A1 is applied to the second data storage device 4, and a completion notification A1 is sent to the first data storage device 2. Subsequently, a write request B1 is received by the second data storage device 4 from the host device 5*a*, applied to the second data storage device 4, and passed to the first data storage device 2.

However, at the first data storage device 2 the write request B1 is received before the completion notification A1. When the write request B1 (only) has been received, the first data storage device 2 does not know whether the second data storage device 4 received and applied the write request A1 before the first data storage device 2 received and applied the write request B1. Consequently, the first data storage device 2 only applies the write request B1 for regions that do not collide with write request A1; in other words, the first data storage device 2 only applies the write request B1 to regions that were not written to by write request A1, so that none of the changes made by write request A1 are overwritten.

When the first data storage device 2 subsequently receives the completion notification A1, as the completion notification A1 does not refer to the write request B1, the first data storage device 2 knows that the second data storage device 4 must have received and applied with write request A1 prior to receiving and applying the write request B1. As a result, the first data storage device 2 also applies the colliding regions of the write request B1, overwriting the changes made by the write request A1 to colliding regions. The first data storage device 2 then sends a completion notification B1 to the second data storage device 4, and a completion notification A1 to the host device 3*a*. When the second data storage device 4 receives the completion notification B1 from the first data storage device 2, the second data storage device 4 sends a completion notification B1 to the host device 5*a*. In this way, the first data storage device 2 and second data storage device 4 both apply the write request A1 prior to the write request B1.

Figure 4:
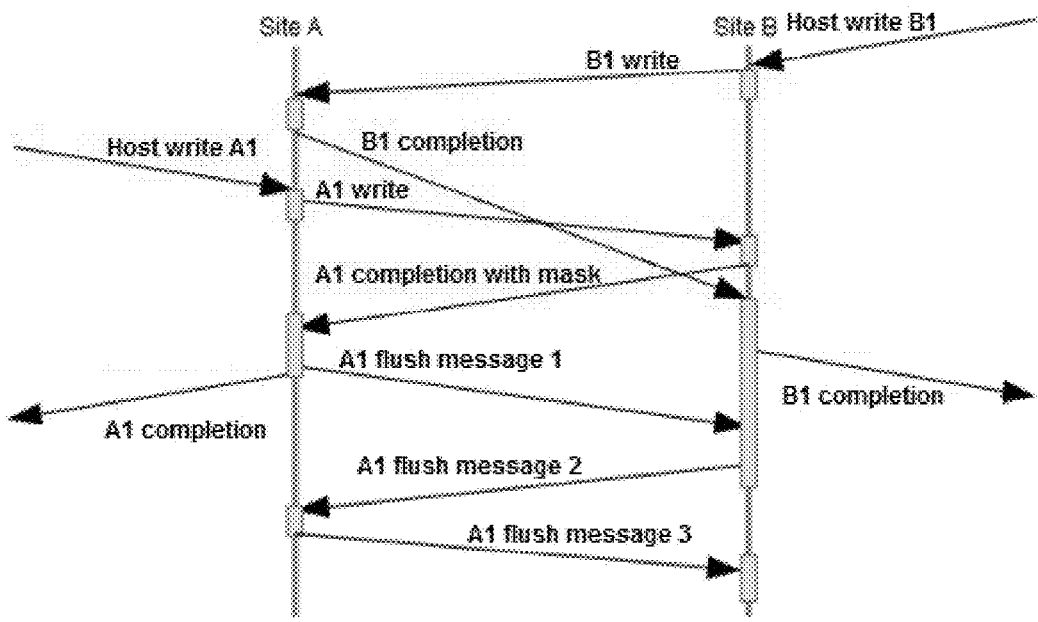
FIG. 4 is a schematic diagram showing a third example of the data storage system of FIG. 1 when handling colliding write requests in accordance with one illustrative embodiment.

A third example of the handling of colliding write requests to the first data storage device 2 and second data storage device 4 is now described with reference to FIG. 4 in accordance with one illustrative embodiment. Again, this example can only occur in a data storage system in which messages can be received out-of-order. In this example, only the second data storage device 4 detects a collision, and the first data storage device 2 has been passed and applied a write request from the second data storage device 4 prior to the second data storage device 4 receiving a local write request.

First, a write request B1 is received by the second data storage device 4 from the host device 5*a*, applied to the second data storage device 4, and passed to the first data storage device 2. The first data storage device 2 applies the write request B1, applied to the first data storage device 2, and completion notification B1 is sent to the second data storage device 4.

A write request A1 is then received by the first data storage device 2 from the host device 3*a*, applied to the first data storage device 2, and passed to the second data storage device 4. However, the write request B1 is received by the second data storage device 4 before the completion notification B1, and so the second data storage device 4 does not know if the first data storage device 2 applied the write request B1 before the second data storage device 4 applied the write request A1. However, as the first data storage device 2 has been determined to be the leader, the second data storage device 4 applies the complete write request A1 anyway (including for any colliding regions). The second data storage device 4 then sends completion notification A1 to the first data storage device 2, but in addition sends a collision mask indicating the regions of write request B1 overwritten by write request A1.

When the second data storage device 4 subsequently received completion notification B1 from the first data storage device 2, as the completion does not refer the write request A1 the second data storage device 4 knows that the first data storage device 2 must have applied the write request B1 before the write request A1, and so the second data storage device 4 is able to send a completion notification B1 to the host device 5*a*. However, the second data storage device 4 maintains a lock, as the second data storage device 4 does not yet know how the first data storage device 2 has processed the write requests. When the first data storage device 2 receives the completion notification A1 with collision mask, the first data storage device 2 knows that the second data storage device 4 also applied the write request B1 before the write request A1, and so the first data storage device 2 sends a flush message 1 to the second data storage device 4, and a completion notification A1 to the host device 3*a*. However, the first data storage device 2 also maintains a lock for the time being.

When the second data storage device 4 received the flush message 1, the second data storage device 4 knows that the first data storage device 2 has processed the write requests so that write request B1 is applied before write request B1, and so the second data storage device 4 sends a flush message 2 to the first data storage device 2. When the first data storage device 2 received the flush message 2, the first data storage device 2 sends a flush message 3 to the second data storage device 4, and releases its lock. When the second data storage device 4 receives the flush message 3, the second data storage device 4 releases its lock. In this way, both the first data storage device 2 and the second data storage device 4 apply the write request B1 before the write request A1. The locking of the first data storage device 2 and the second data storage device 4 until all the flush messages are received is necessary to allow any required processing of collision masks to be performed, as discussed below.

Figure 5:
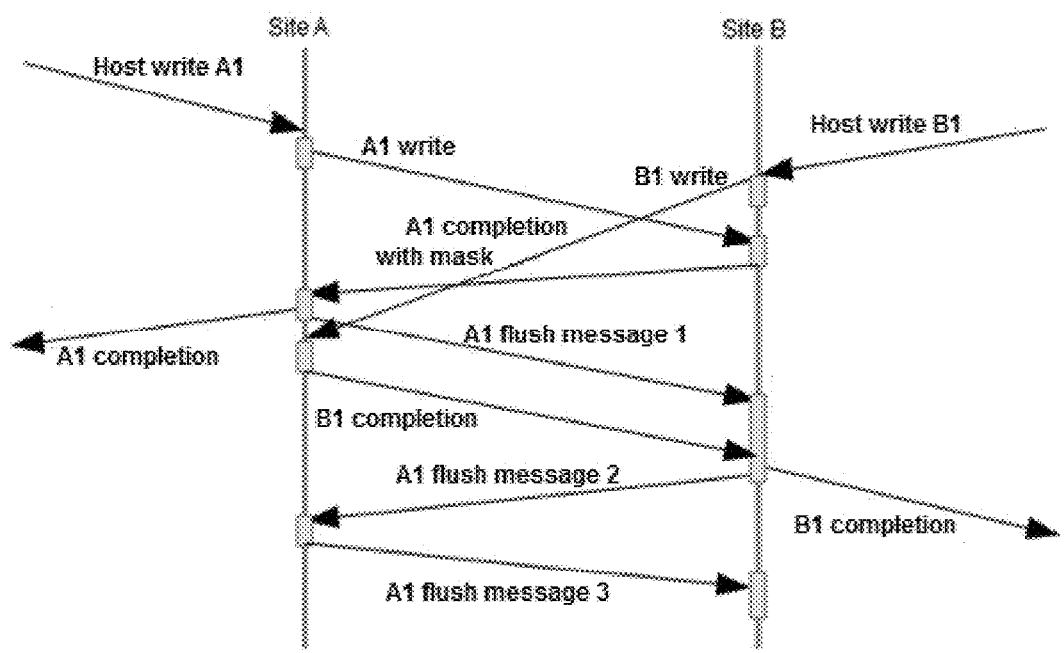
FIG. 5 is a schematic diagram showing a fourth example of the data storage system of FIG. 1 when handling colliding write requests in accordance with one illustrative embodiment.

A fourth example of the handling of colliding write requests to the first data storage device 2 and second data storage device 4 is now described with reference to FIG. 5 in accordance with one illustrative embodiment. Again, this example can only occur in a data storage system in which messages can be received out-of-order. In this example, only the second data storage device 4 detects a collision, and the first data storage device 2 has received and applied a local write request prior to the first data storage device 2 being passed a write request by the second data storage device 4.

First, a write request A1 is received by the first data storage device 2 from the host device 3*a*, applied to the first data storage device 2, and passed to the second data storage device 4. However, before the second data storage device 4 receives the write request A1 from the first data storage device 2, the second data storage device 4 receives a write request B1 from the host device 5*a*, applies the write request B1, and passes the write request to the first data storage device 2.

When the second data storage device 4 subsequently receives the write request A1 from the first data storage device 2, as in the preceding example the second data storage device 4 does not know if the first data storage device 2 applied the write request B1 before the first data storage device 2 applied the write request A1, but the second data storage device 4 applies the complete write request A1 anyway (including for any colliding regions) and sends the completion notification A1 to the first data storage device 2, along with a collision mask indicating the regions of write request B1 overwritten by write request A1.

In the present example the first data storage device 2 next receives the completion notification A1 with collision mask from the second data storage device 4. Due to the collision mask, the first data storage device 2 knows that there is write request that the first data storage device 2 has not yet received from the second data storage device 4. However, again due to the collision mask the first data storage device 2 knows that the second data storage device 4 applies the write request A1 after the write request B1, and so the first data storage device 2 is able to send the completion notification A1 to the host device 3a. The first data storage device 2 then sends a flush message 1 to the second data storage device 4. When the second data storage device 4 receives the flush message 1, the second data storage device 4 does waits before doing anything further as the second data storage device 4 is still waiting for a completion notification B1 from the first data storage device 2.

When the first data storage device 2 receives the write request B1, the first data storage device 2 does not yet apply write request B1 at all as the first data storage device 2 is still waiting for resolution of the flush messages, but maintains its lock. However, the first data storage device 2 sends a completion notification B1 to the second data storage device 4, which then sends a completion notification B1 to the host device 5a, and a flush message 2 to the first data storage device 2, but also maintains its lock. When the first data storage device 2 receives the flush message 2, the first data storage device 2 then applies only the regions of the write request B1 that do not collide with the write request A1, so that it is as if the write request B1 was applied before the write request A1. The first data storage device 2 then sends a flush message 3 to the second data storage device 4 and releases its lock, and, when the second data storage device 4 receives the flush message 3, the second data storage device 4 also releases its lock. In this way, both the first data storage device 2 and the second data storage device 4 apply the write request A1 before the write request B1.

Figure 6:
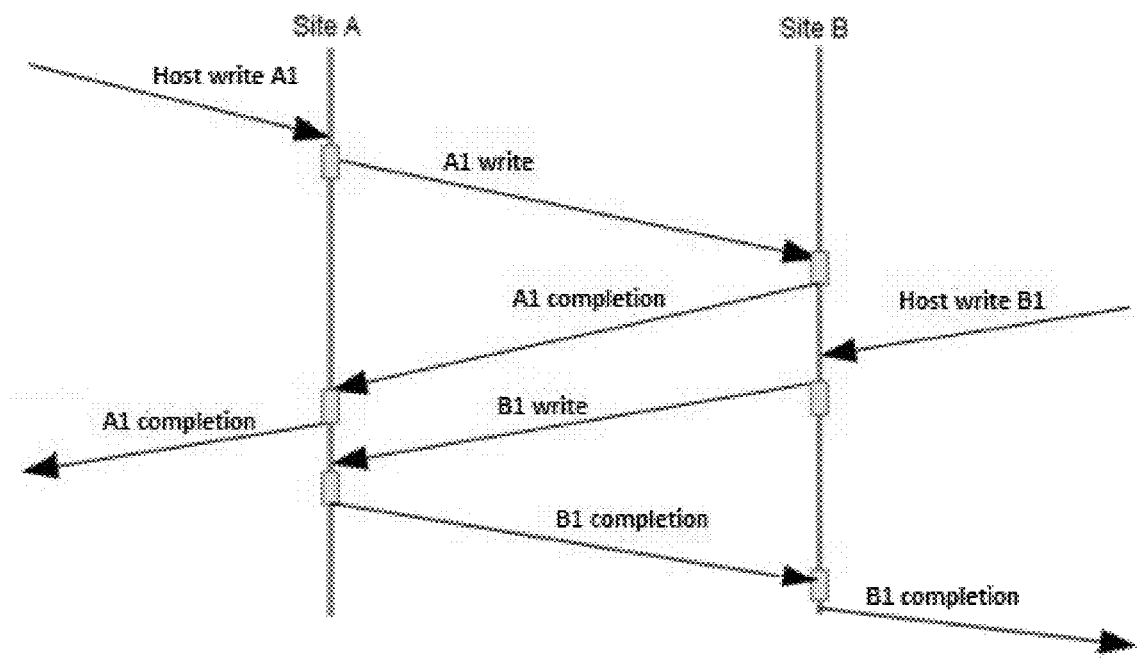
FIG. 6 is a schematic diagram showing an example of the data storage system of FIG. 1 when handling non-colliding write requests in accordance with one illustrative embodiment.

It may of course be the case that write requests are made to the first data storage device 2 and second data storage device 4 without any write collision occurring, as is now described with reference to FIG. 6 in accordance with one illustrative embodiment.

First, a write request A1 is received by the first data storage device 2 from the host device 3a, applied to the first data storage device 2, and passed to the second data storage device 4. The second data storage device 4 applies the write request A1, and sends a completion notification A1 to the first data storage device 2. A write request B1 is then received by the second data storage device 4 from the host device 5a, applied to the second data storage device 4, and passed to the first data storage device 2. As no collision has been detected (or indeed has occurred), the first data storage device 2 applies the write request B1 and sends a completion notification B1 to the second data storage device 4.

In the above ways, the data stored by the first data storage device 2 and second data storage device 4 at sites A and B is replicated. It is now described, with reference to FIGS. 7 to 11, how the data can be further replicated at non-active sites C and D by the third data storage 5 and fourth data storage device 7, and indeed at other non-active sites with additional data storage devices. In each case, the requests to update data are sent to the non-active sites C, D and so on by the first data storage device 2 at site A, as the first data storage device 2 has been determined to be the leader.

Figure 7:
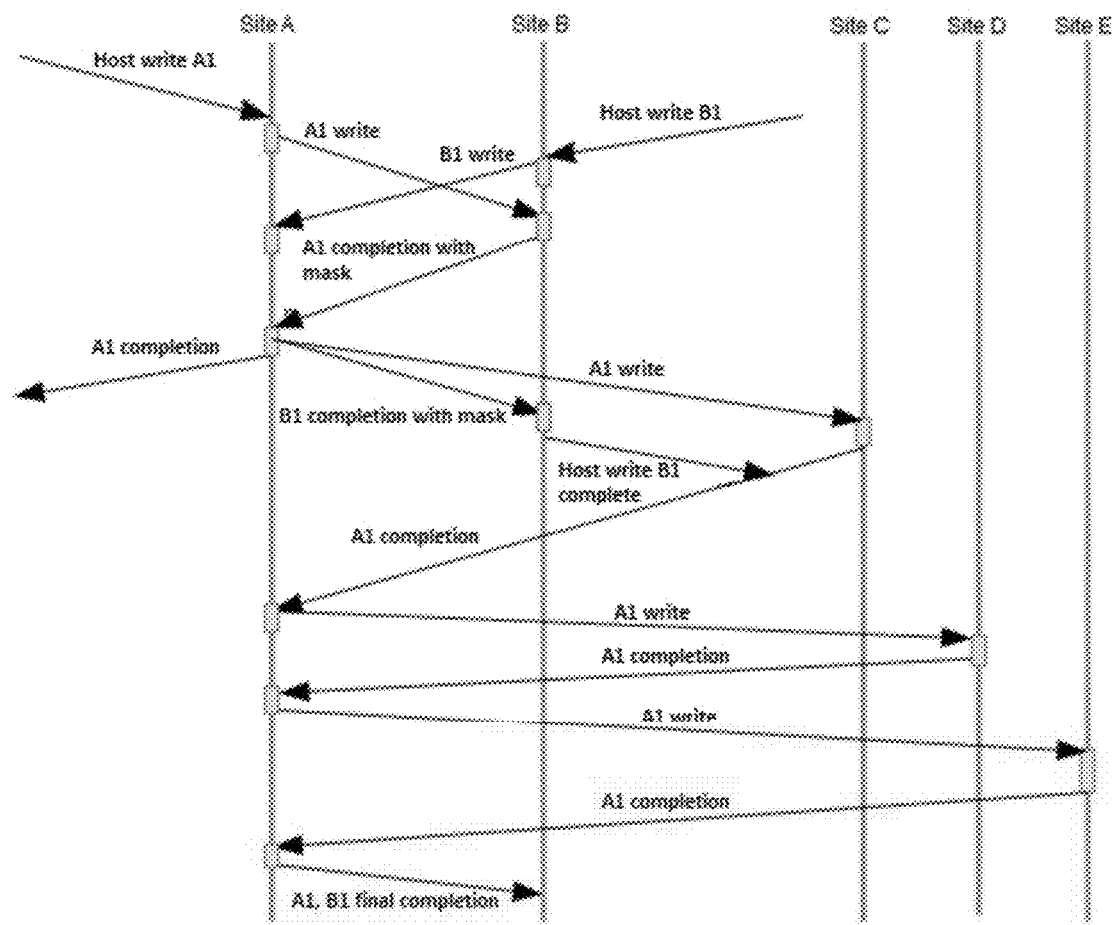
FIG. 7 is a schematic diagram showing a first example of the data storage system of FIG. 1 when replicating data at non-active sites in accordance with one illustrative embodiment.

A first example is now described with reference to FIG. 7, in which the replication between sites A and B occurs in the same fashion as in FIG. 2, but the data is also replicated to non-active sites C, D and E in accordance with one illustrative embodiment. As with FIG. 2, the first data storage device 2 and the second data storage device 4 receives host write requests A1 and B1 respectively, and so send write requests A1 and B1 to the other data storage device. As both write request A1 and B1 are received by the data storage devices before they have received a completion notification for their own write request, the writes have collided. This means, in particular, that the first data storage device 2 cannot yet send any write requests to the third data storage device 6, fourth data storage device 7, and the data storage device at site E, as the first data storage device 2 does not yet know how the second data storage device 4 has experienced the write collision, so what action the first data storage device 2 will have taken.

However, once the first data storage device 2 receives the A1 completion notification with mask from the second data storage device 4 and knows that the second data storage device 4 will have applied the write request A1 completely, the first data storage device 2 can therefore send the write request A1 to the third data storage device 6, fourth data storage device 7, and the data storage device at site E. The first data storage device 2 can do this at the same time as sending the B1 completion notification with mask to the second data storage device 4, as the first data storage device 2 knows that it is not necessary to wait until the second data storage device 4 has completed its writes before sending the write request A1 to the other sites.

Each of the third data storage device 6, fourth data storage device 7, and the data storage device at site E sends an A1 completion notification back to the first data storage device 2 once the A1 write request is applied, and, once the first data storage device 2 has received A1 completion notifications from every site, the first data storage device 2 sends an A1, B1 final completion notification to the second data storage device 4.

It will be appreciated that in alternative embodiments a separate final completion notification could be sent by the first data storage device 2 to the second data storage device 4 as each write request is applied at the non-active sites, rather than waiting for all write request to be applied and then sending a single final completion notification to the second data storage device 4. In such an embodiment, the second data storage device 4 has more accurate knowledge of which non-active sites have applied each write, permitting a more rapid resynchronization of the non-active sites if the first data storage device 2 fails in some way.

In the present example, it is assumed that the write request A1 completely overwrites the write request B1, and so only the write request A1 needs to be sent to the other sites. However, in examples in which the write request B1 is not completely overwritten, the first data storage device 2 would also send the non-overwritten parts of the write request B1 to the other sites along with the write request A1. Alternatively, with equivalent effect, the first data storage device 2 could send the write request B1 followed by the write request A1 to the other sites, but the first data storage device 2 would either need to wait for a B1 completion notification before sending write request A1, or to be operating in a system in which messages could not be received out of order.

Figure 8:
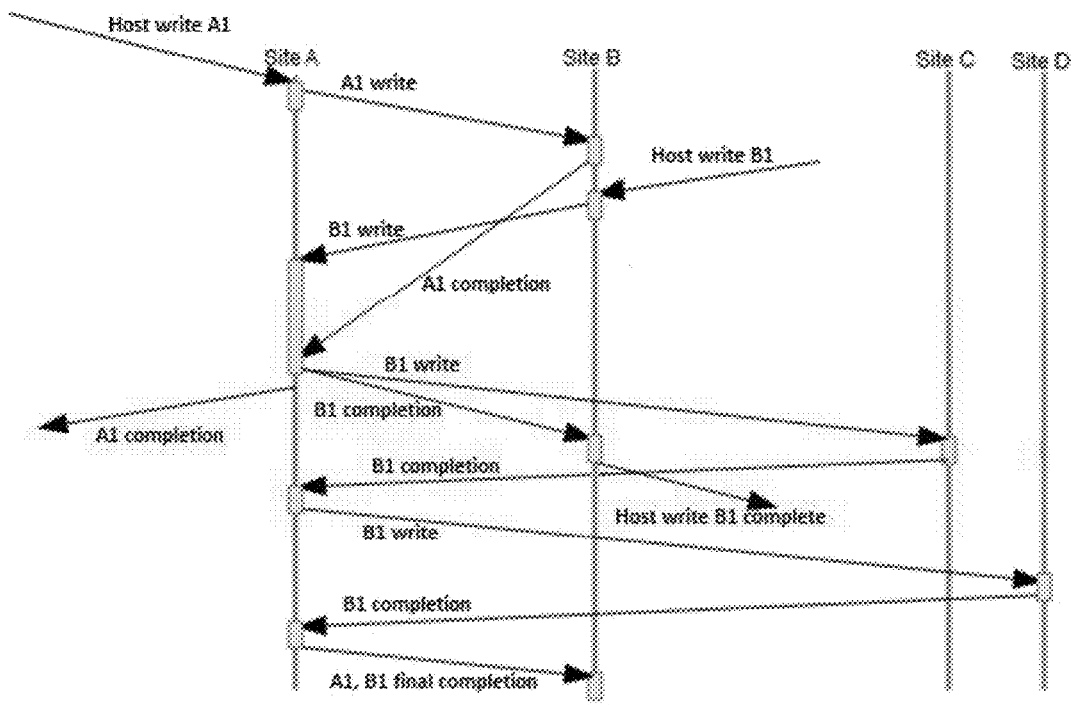
FIG. 8 is a schematic diagram showing a second example of the data storage system of FIG. 1 when replicating data at non-active sites in accordance with one illustrative embodiment.

A second example is now described with reference to FIG. 8, in which the replication between sites A and B occurs in the same fashion as in FIG. 3, but the data is also replicated to non-active sites C and D in accordance with one illustrative embodiment. In this example, again the first data storage device 2 must wait until the first data storage device 2 has received a completion notification from the second data storage device 4 before the first data storage device 2 sends any write requests to the third data storage device 6 and fourth data storage device 7, as, until the first data storage device 2 received the completion notification, the first data storage device 2 does not know how the second data storage device 4 has experienced the write collision so what action the second data storage device 4 will have taken.

In the present example, as the first data storage device 2 receives an A1 completion notification without mask, the first data storage device 2 knows that the second data storage device 4 has applied the write request B1 after the write request A1, so the write request A1 has been overwritten and only the write request B1 needs to be sent to the third data storage device 6 and fourth data storage device 7. (Similarly to the preceding example, it is assumed that the write request B1 completely overwrites the write request A1.)

Figure 9:
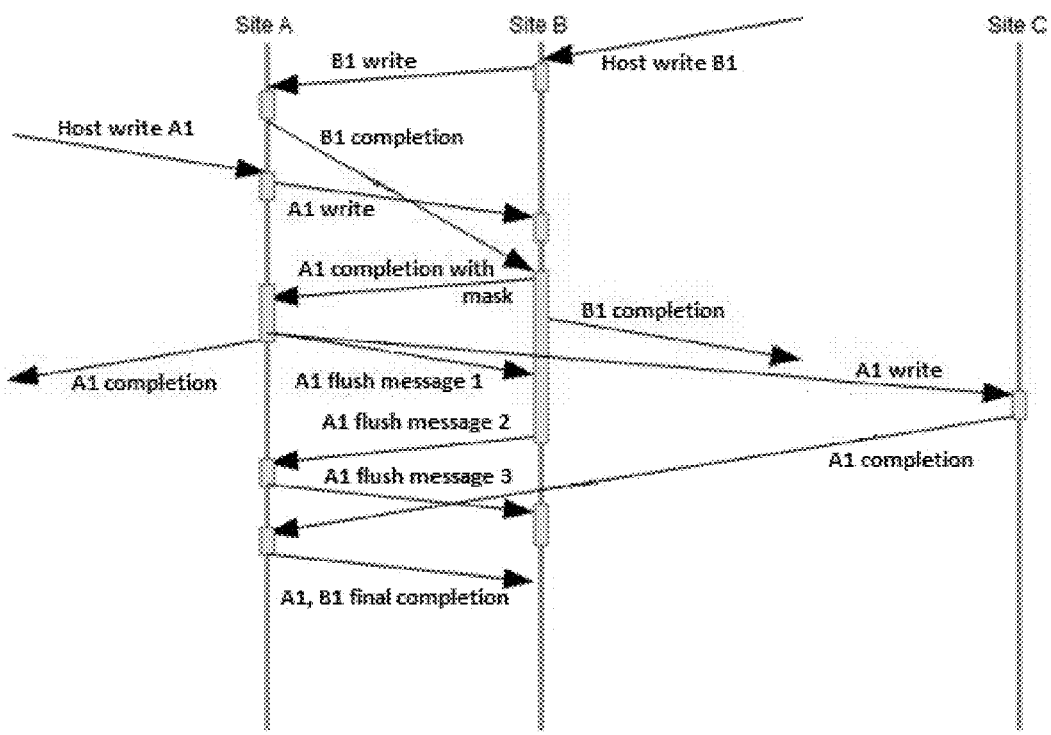
FIG. 9 is a schematic diagram showing a third example of the data storage system of FIG. 1 when replicating data at a non-active site in accordance with one illustrative embodiment.

A third example is now described with reference to FIG. 9, in which the replication between sites A and B occurs in the same fashion as in FIG. 4, but the data is also replicated to non-active site C in accordance with one illustrative embodiment. In this example, only the second data storage device 4 detects that there has been a write collision, with the write request B1 reaching the first data storage device 2 before the host write request A1 is received. In this case, the collision-resolved data, in this case write request A1, is sent by the first data storage device 2 to the third data storage device 6 at site C when the first data storage device 2 receives the A1 completion notification with mask from the second data storage device 4.

While in the present example the A1 completion notification is received from the third data storage device 6 after the first data storage device 2 has sent the A1 flush message 3 to the second data storage device 4, if the A1 completion notification is received from the third data storage device 6 before the A1 flush message 3 is sent to the second data storage device 4, which may be particularly likely to occur where there is only a single non-active site, the A1, B1 final completion notification could be piggybacked onto or otherwise coalesced with A1 flush message 3.

Figure 10:
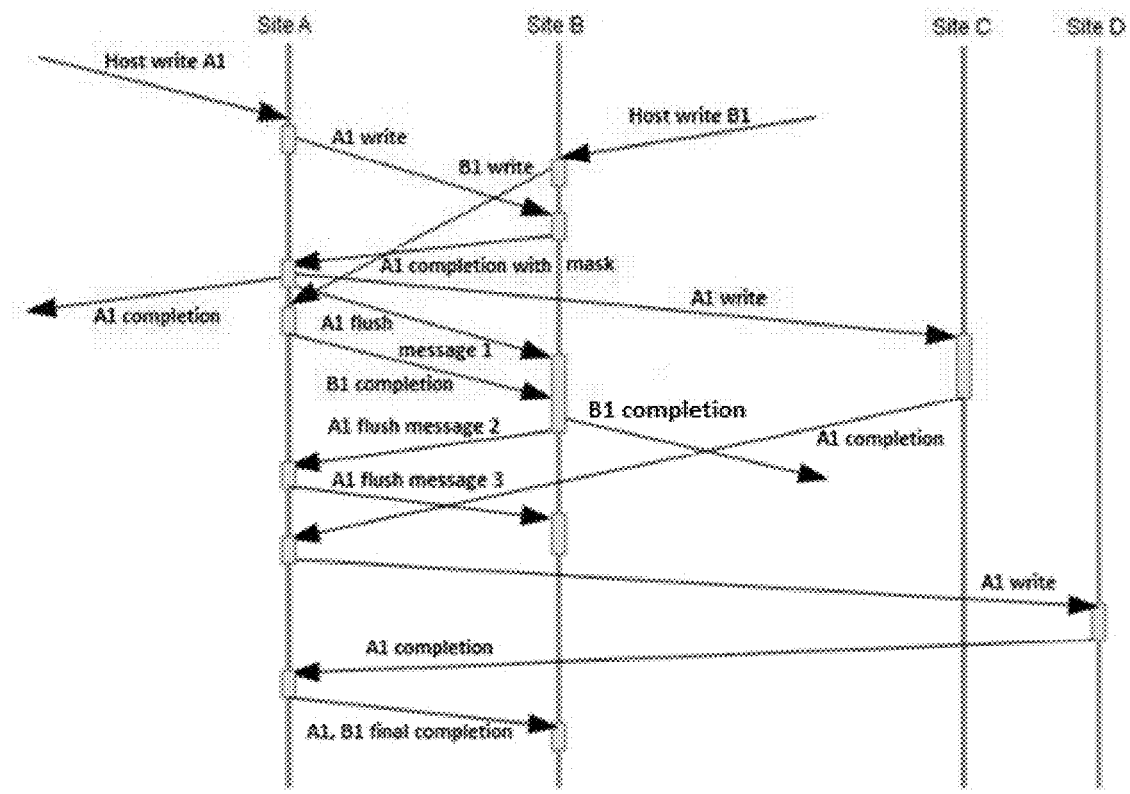
FIG. 10 is a schematic diagram showing a fourth example of the data storage system of FIG. 1 when replicating data at non-active sites in accordance with one illustrative embodiment.

A fourth example is now described with reference to FIG. 10, in which the replication between sites A and B occurs in the same fashion as in FIG. 5, but the data is also replicated to non-active sites C and D in accordance with one illustrative embodiment. In this example, as in the preceding example only the second data storage device 4 detects that there has been a write collision, but the write request B1 reaches the first data storage device 2 after the host write request A1 is received. In this case, the collision-resolved data, again in this case write request A1, is sent by the first data storage device 2 to the third data storage device 6 at site C and the fourth data storage device 7 at site D when the first data storage device 2 receives the A1 completion notification with mask from the second data storage device 4.

Figure 11:
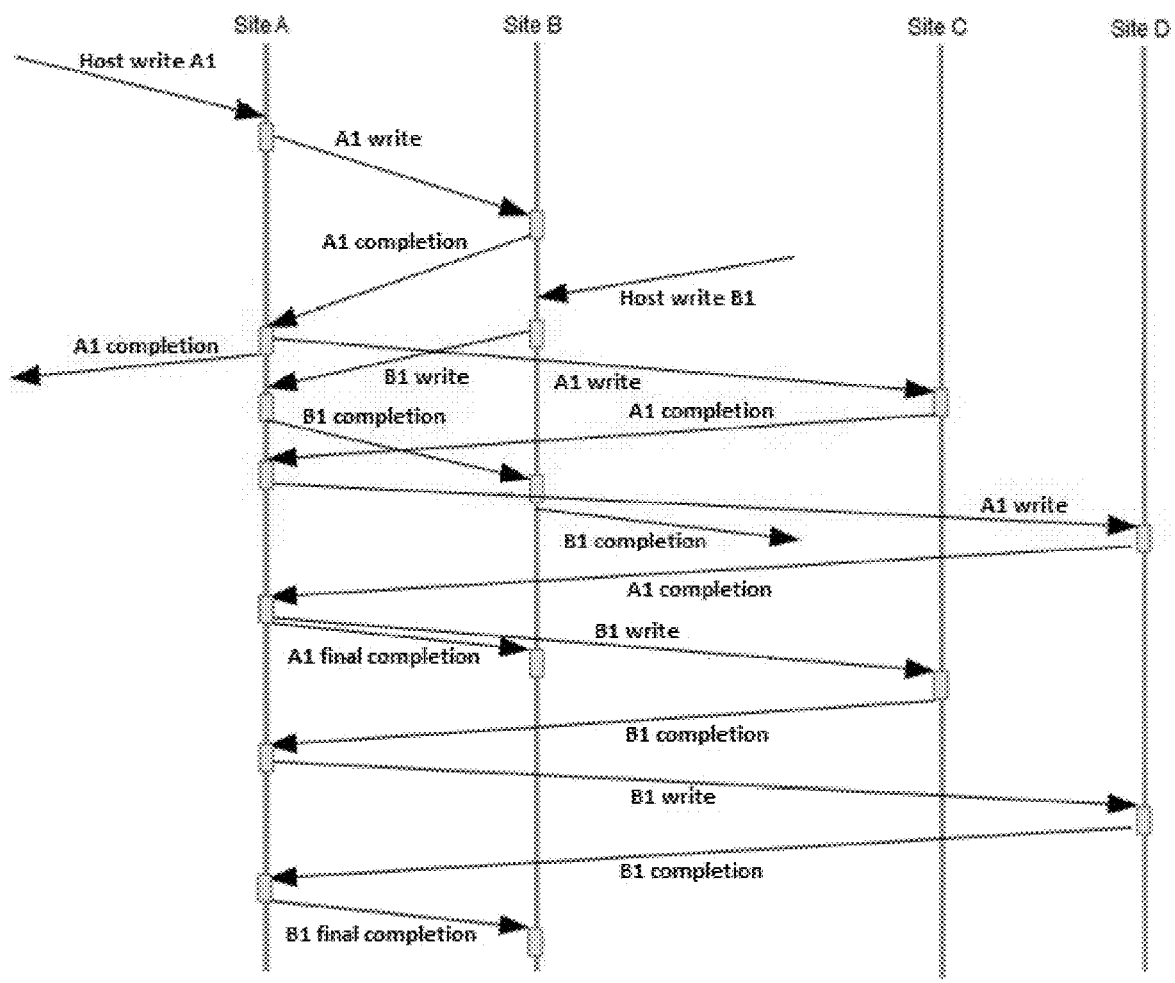
FIG. 11 is a schematic diagram showing a fifth example of the data storage system of FIG. 1 when replicating data at non-active sites in accordance with one illustrative embodiment.

A fifth example is now described with reference to FIG. 11, in which the replication between sites A and B occurs in the same fashion as in FIG. 6, but the data is also replicated to non-active sites C and D in accordance with one illustrative embodiment. In this example, no write collision occurs. When sending the data to the third data storage device 6 and the fourth data storage device 7 at the non-active sites C and D, only a single write per block is allowed to be outstanding at a time, to ensure data is applied correctly. This means that the write request B1 cannot be sent to the third data storage device 6 and the fourth data storage device 7 by the first data storage device 2 as soon as its non-collision is discovered, but rather the first data storage device 2 must wait until the earlier write request A1 has been applied by both the third data storage device 6 and the fourth data storage device 7.

In an alternative embodiment, the write request B1 could be sent to the third data storage device 6 in parallel with the write request A1 being sent to the fourth data storage device 7, for example. This would help minimise the time during which there was a difference between data stored at the active sites and at the non-active sites, but at the cost of increased code complexity.

In a particularly advantageous embodiment, when the data storage device that is not determined to be the leader (i.e. the second data storage device 4 in the above examples) processes a write request arises at either site, the data storage device temporarily records the details of the write request (e.g. its metadata) in a resynchronization table. Conversely, when the data storage device receives a final completion notification for a write request, the data storage device clears the write request from the resynchronization table.

The resynchronization table may be provided by a circular buffer, hash table or any other suitable means. In practice the number of stored writes should be fairly small, say up to several thousand. The entire write request does not need to be recorded, and only for example the metadata will be sufficient (e.g. the volume number and data range), as the metadata can be used by the second data storage device 4 to re-read the data stored on itself to determine the required content of the write requests.

If the first data storage device 2 then fails in some way, the second data storage device 4 pauses processing of write and read requests, re-reads all write requests recorded in the resynchronization table, and sends the re-read data to all non-active sites, e.g. to the third data storage device 6 and the fourth data storage device 7. (This is likely to take less than a second.) The data storage device of a non-active site is then be selected to replace the first data storage device 2, with its site becoming an active site, and processing of write and read requests resuming. Site A, the site of the first data storage device 2, becomes a non-active site.

If on the other hand the second data storage device 4 fails, the first data storage device 2 continues processing of write and read requests, the data storage device of a non-active site is selected to replace the second data storage device 4, and site B, the site of the second data storage device 4, becomes a non-active site.

Finally, if the data storage device of any non-active site fails, the first data storage device 2 and the second data storage device 4 can continue processing of write and read requests as normal. The first data storage device 2 and/or the second data storage device 4 can record write requests processed in the absence of the failed data storage device, for example using a bitmap, to allow each to perform incremental resynchronization in the absence of the other.

It will appreciated that embodiments of the invention could include more than two data storage devices, as long as for any pair of data storage devices a characteristic of each device can be used to select one as the "leader" and the other as the "follower". While in the embodiment described above the MAC address of the data storage devices is used, it will be appreciated that any other "static" fact could be used. To give just one alternative example, the data storage devices could be assigned a priority number when they are added to the data storage system.

While the present invention has been described and illustrated with reference to particular embodiments, it will be appreciated by those of ordinary skill in the art that the invention lends itself to many different variations not specifically illustrated herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for replicating data in a data storage system, wherein the data storage system comprises:

a first data storage device comprising a set of data regions;
a first host device in communication with the first data storage device;
a second data storage device comprising a set of data regions corresponding to the set of data regions of the first data storage device;
a second host device in communication with the second data storage device; and
a third data storage device comprising a set of data regions corresponding to the set of data regions of the first data storage device and the set of data regions of the second data storage device, the third data storage device being arranged to receive write requests from only the first data storage device and the second data storage device;
wherein the method comprises:
selecting one of the first data storage device and the second data storage device using a characteristic of the first data storage device and the second data storage device;
receiving, in the first data storage device, a first write request from the first host device to update a first subset of the data regions, and sending, from the first data storage device, the first write request to the second data storage device;
receiving, in the second data storage device, a second write request from the second host device to update a second subset of the data regions, and sending, from the second data storage device, the second write request to the first data storage device;
either:
in the case that the first data storage device is selected using the characteristic and in response to a notification from the second data storage device that the second data storage device has been updated in accordance with the first write request, sending, from the first data storage device, a write request based on the first write request and the second write request to the third storage device; or
in the case that the second data storage device is selected using the characteristic and in response to a notification from the first data storage device that the first data storage device has been updated in accordance with the second write request, sending, from the second data storage device, a write request based on the first write request and the second write request to the third storage device;
in the case that either the first data storage device or the second data storage device not selected using the characteristic, storing details indicative of received write requests; and
in the case that either the first data storage device or the second data storage device selected using the characteristic fails, sending, from either the first data storage device or the second data storage device not selected using the characteristic, the write requests indicated by the stored details to the third data storage device.

2. The method of claim 1, further comprising:
from the data storage device selected using the characteristic, in response to a notification from the third data storage device that the third data storage device has been updated in accordance with the write request, sending a notification to the data storage device not selected using the characteristic that the third data storage device has been updated.

3. The method of claim 1, wherein the first data storage device receives the second write request from the second data storage device prior to the notification from the second data storage device that the second data storage device has been updated in accordance with the first write request; and:
in the case that the first data storage device is selected using the characteristic, updating, in the first data storage device, the data regions that are in the second subset of the data regions but not in the first subset of the data regions in accordance with the second write request; or
in the case that the second data storage device is selected using the characteristic, updating, in the first data storage device, the data regions that are in the second subset of the data regions in accordance with the second write request.

4. The method of claim 1, wherein the characteristic of the first data storage device and the second data storage device is the Media Access Control (MAC) addresses of the first data storage device and the second data storage device.

5. A data storage system for replicating data, the data storage system comprising:
a first data storage device comprising a set of data regions;
a first host device in communication with the first data storage device;
a second data storage device comprising a set of data regions corresponding to the set of data regions of the first data storage device;
a second host device in communication with the second data storage device; and
a third data storage device comprising a set of data regions corresponding to the set of data regions of the first data storage device and the set of data regions of the second data storage device, the third data storage device being arranged to receive write requests from only the first data storage device and the second data storage device;
wherein the data storage system is arranged to:
select one of the first data storage device and the second data storage device using a characteristic of the first data storage device and the second data storage device;
receive, in the first data storage device, a first write request from a first host device to update a first subset of the data regions;
send, from the first data storage device, the first write request to the second data storage device;
receive, in the second data storage device, a second write request to update a second subset of the data regions from the second host device;
send, from the second data storage device, the second write request to the first data storage device;
either:
in the case that the first data storage device is selected using the characteristic and in response to a notification from the second data storage device that the second data storage device has been updated in accordance with the first write request, send, from the first data storage device, a write request based on the first write request and the second write request to the third storage device; or
in the case that the second data storage device is selected using the characteristic and in response to a notification from the first data storage device that the first data storage device has been updated in accordance with the second write request, send, from the second data storage device, a write request based on the first write request and the second write request to the third storage device;

in the case that either the first data storage device or the second data storage device is not selected using the characteristic, store details indicative of received write requests; and in the case that either the first data storage device or the second data storage device selected using the characteristic fails, send, from either the first data storage device or the second data storage device not selected using the characteristic, the write requests indicated by the stored details to the third data storage device.

6. The data storage system of claim 5, further arranged to:
in the case that the first data storage device is selected using the characteristic, in response to a notification from the third data storage device that the third data storage device has been updated in accordance with the write request, send a notification to the second data storage device that the third data storage device has been updated.

7. The data storage system of claim 5, further arranged to:
in the case that the first data storage device receives the second write request from the second data storage device prior to the notification from the second data storage device that the second data storage device has been updated in accordance with the first write request:
in the case that the first data storage device is selected using the characteristic, update, in the first data storage device, the data regions that are in the second subset of the data regions but not in the first subset of the data regions in accordance with the second write request; or
in the case that the second data storage device is selected using the characteristic, update, in the first data storage device, the data regions that are in the second subset of the data regions in accordance with the second write request.

8. The data storage system of claim 5, wherein the characteristic of the first data storage device and the second data storage device is the Media Access Control (MAC) addresses of the first data storage device and the second data storage device.

9. A computer program product for replicating data in a computing system comprising a non-transitory computer readable storage medium having a computer readable program stored therein, wherein the computer readable program, when executed on a computing system comprising:
a first data storage device comprising a set of data regions;
a first host device in communication with the first data storage device;
a second data storage device comprising a set of data regions corresponding to the set of data regions of the first data storage device;
a second host device in communication with the second data storage device; and
a third data storage device comprising a set of data regions corresponding to the set of data regions of the first data storage device and the set of data regions of the second data storage device, the third data storage device being arranged to receive write requests from only the first data storage device and the second data storage device;
causes the computing device to:
select one of the first data storage device and the second data storage device using a characteristic of the first data storage device and the second data storage device;
receive, in the first data storage device, a first write request from a first host device to update a first subset of the data regions;

send, from the first data storage device, the first write request to the second data storage device;
receive, in the second data storage device, a second write request to update a second subset of the data regions from the second host device;
send, from the second data storage device, the second write request to the first data storage device;
either:
in the case that the first data storage device is selected using the characteristic and in response to a notification from the second data storage device that the second data storage device has been updated in accordance with the first write request, send, from the first data storage device, a write request based on the first write request and the second write request to the third storage device; or
in the case that the second data storage device is selected using the characteristic and in response to a notification from the first data storage device that the first data storage device has been updated in accordance with the second write request, send, from the second data storage device, a write request based on the first write request and the second write request to the third storage device;
in the case that either the first data storage device or the second data storage device is not selected using the characteristic, store details indicative of received write requests; and
in the case that either the first data storage device or the second data storage device selected using the characteristic fails, send, from either the first data storage device or the second data storage device not selected using the characteristic, the write requests indicated by the stored details to the third data storage device.

10. The computer program product of claim 9, wherein the computer readable program further causes the computing system to:
in the case that the first data storage device is selected using the characteristic, in response to a notification from the third data storage device that the third data storage device has been updated in accordance with the write request, send a notification to the second data storage device that the third data storage device has been updated.

11. The computer program product of claim 9, wherein the computer readable program further causes the computing system to:
in the case that the first data storage device receives the second write request from the second data storage device prior to the notification from the second data storage device that the second data storage device has been updated in accordance with the first write request:
in the case that the first data storage device is selected using the characteristic, update, in the first data storage device, the data regions that are in the second subset of the data regions but not in the first subset of the data regions in accordance with the second write request; or
in the case that the second data storage device is selected using the characteristic, update, in the first data storage device, the data regions that are in the second subset of the data regions in accordance with the second write request.

12. The computer program product of claim 9, wherein the characteristic of the first data storage device and the second data storage device is the MAC addresses of the first data storage device and the second data storage device.

\* \* \* \* \*